United States Patent [19]
Block

[11] 3,885,779
[45] May 27, 1975

[54] CONTROL MECHANISM

[76] Inventor: Donald P. Block, 147 Deerwood Dr., Orlando, Fla. 06231

[22] Filed: July 11, 1973

[21] Appl. No.: 378,086

Related U.S. Application Data

[62] Division of Ser. No. 248,221, April 27, 1972, Pat. No. 3,762,140.

[52] U.S. Cl. .................................. 251/229; 56/10.2
[51] Int. Cl. ...................... F16k 31/44; A01d 75/28
[58] Field of Search .......... 56/10.2, 10.4, 330, 331; 172/5, 23, 38, 233; 251/229, 242–246

[56] References Cited
UNITED STATES PATENTS 2,608,146   8/1952   Lund ........................................ 172/5
3,117,589   1/1964   Billeter ............................ 251/229 X

*Primary Examiner*—Henry T. Klinksiek
*Attorney, Agent, or Firm*—A. J. Moore; C. E. Tripp

[57] ABSTRACT

A control mehanism for actuating a switch having a switching element movable between an extended and a retracted position in response to contacting an abutment. The control mechanism includes a sensing arm that is effective to retract the slide rake when engaging an obstacle when moving forwardly, rearwardly or at an angle relative to the normal direction of movement of the vehicle.

6 Claims, 8 Drawing Figures

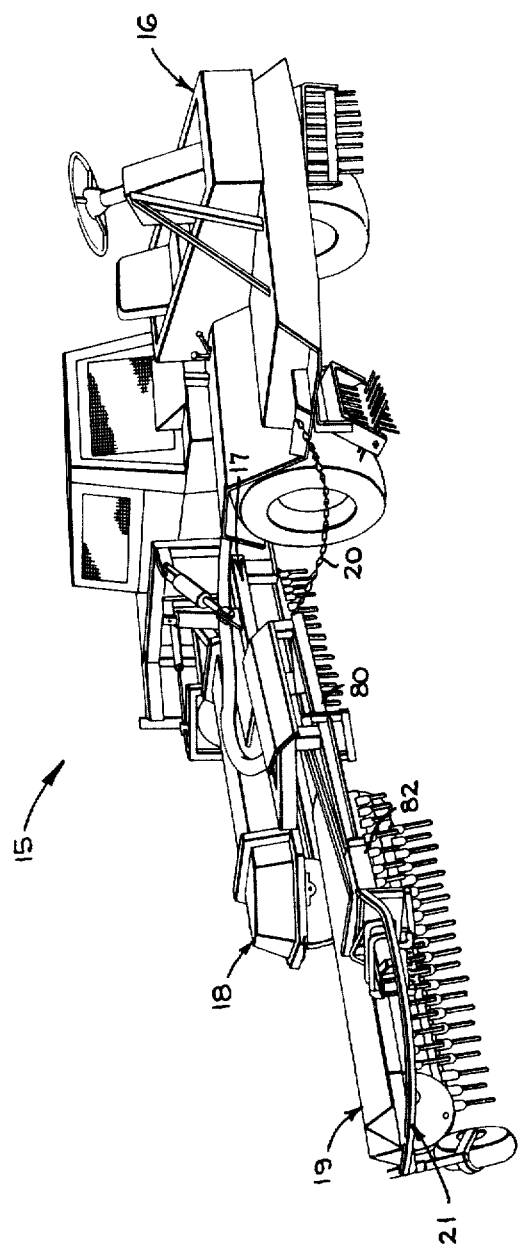
FIG_1

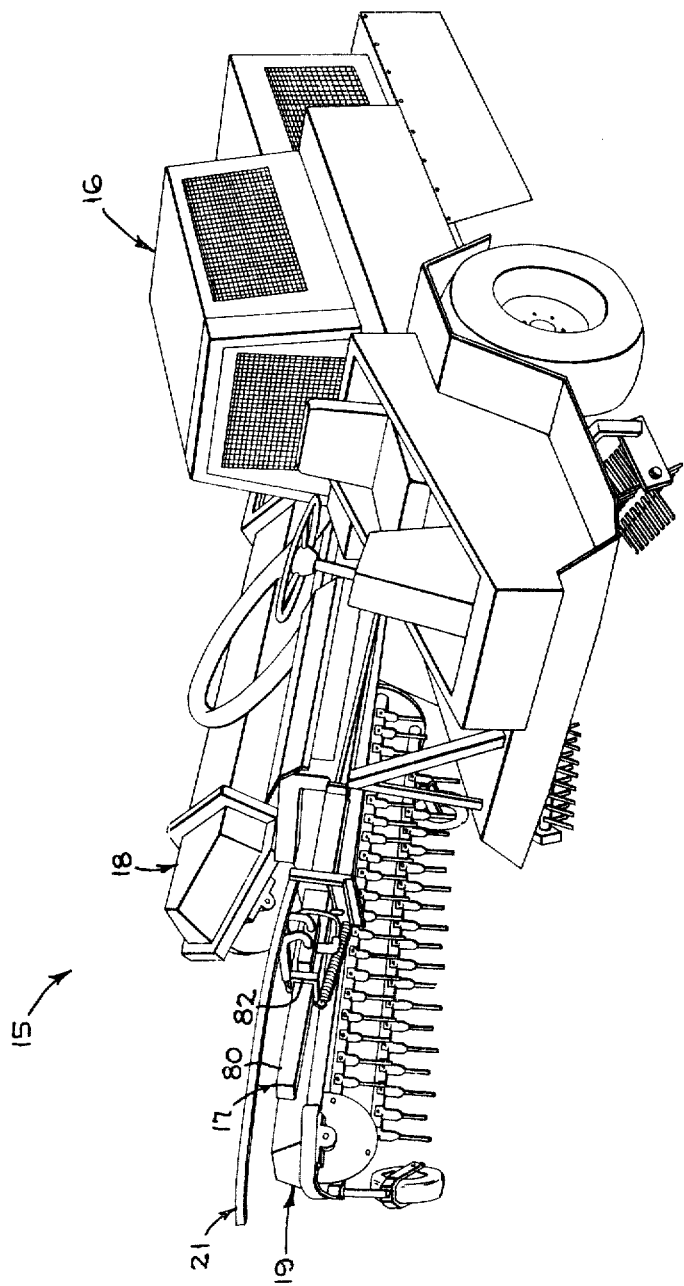

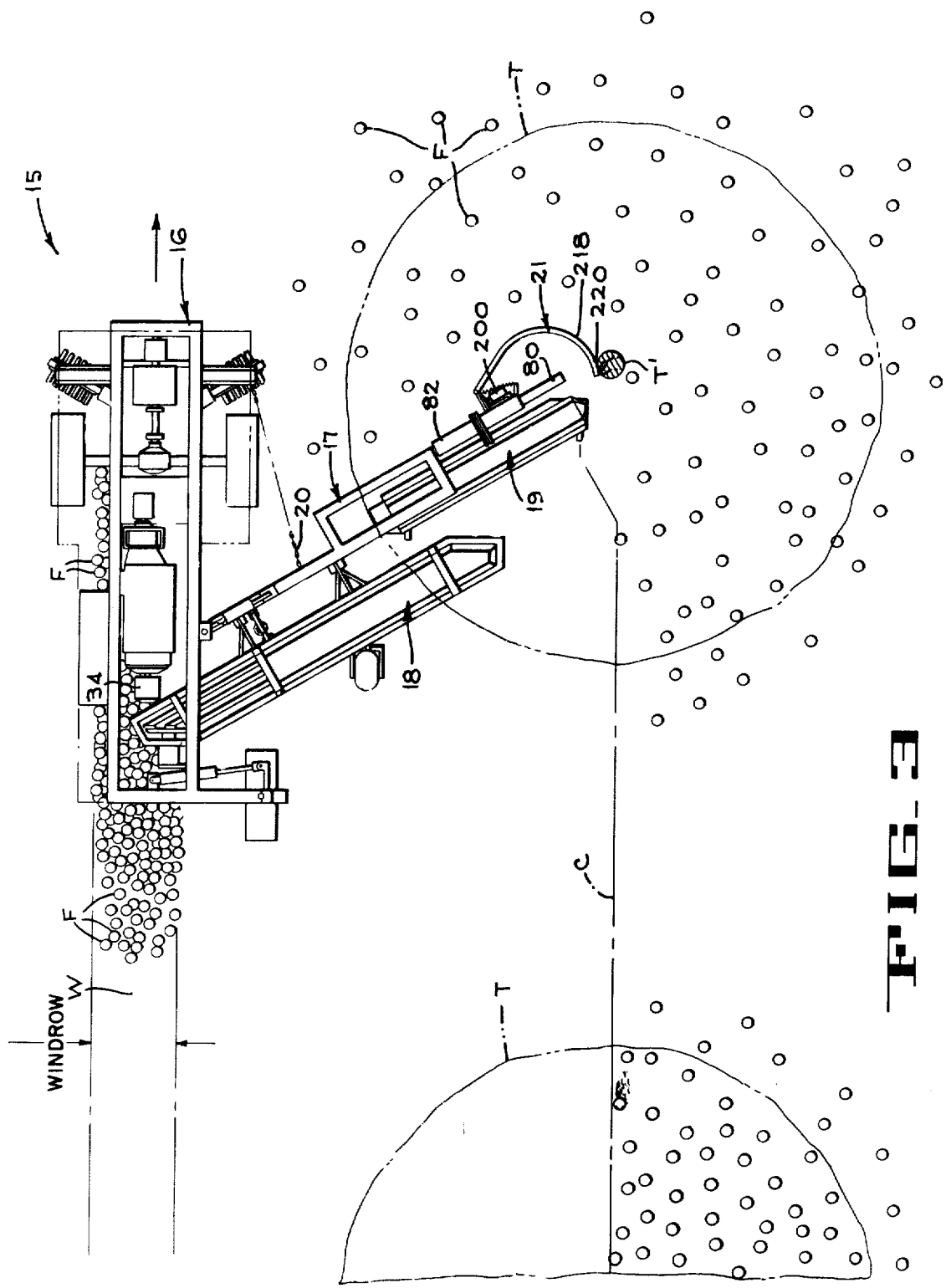

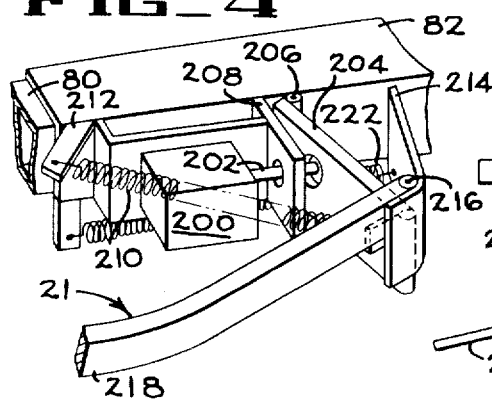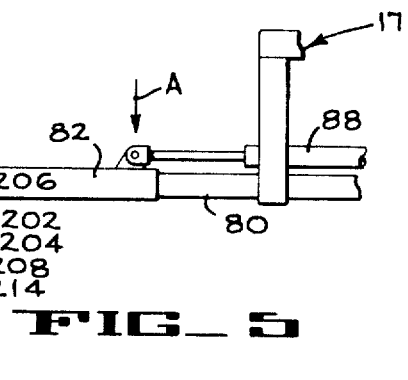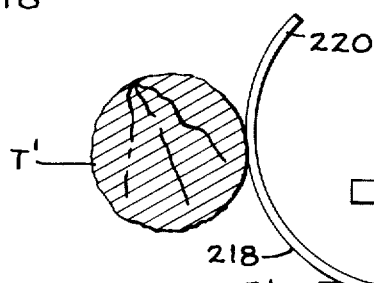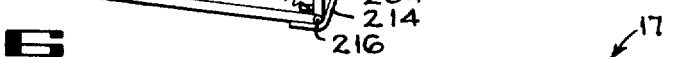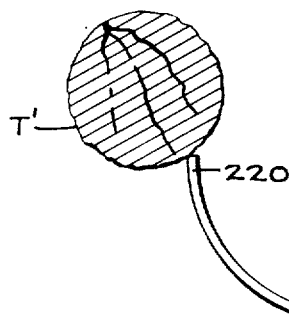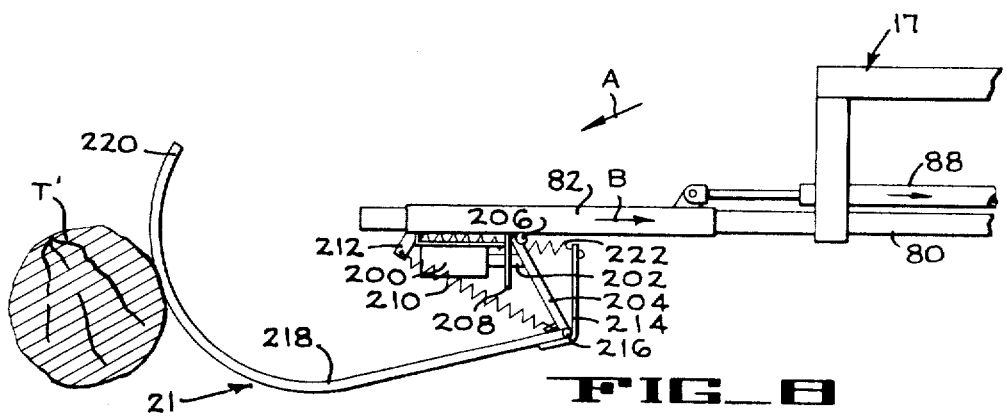

CONTROL MECHANISM

CROSS REFERENCE TO RELATED APPLICATION

The present application is a division of Donald P. Block application Ser. No. 248,221, filed Apr. 27, 1972, now U.S. Pat. No. 3,762,140 which was issued on Oct. 2, 1973.

BACKGROUND OF THE INVENTION

1. Field of the Invention

This invention pertains to a control mechanism for actuating a switch element in response to a sensing arm contacting an abutment.

2. Description of the Prior Art

The patent to Coogan U.S. Pat. No. 3,006,420 discloses cultivators and controls therefor that are effective for retracting a cultivating tool out of a tree trunk centerline when the tool approaches an obstacle such as a tree trunk, stake, or the like which is the preferred use of the control mechanism of the present invention as fully disclosed in my parent application, now U.S. Pat. No. 3,762,140.

SUMMARY OF THE INVENTION

The windrowing machine, with which the slide rake actuating or control mechanism of the present invention is associated, is specifically designed for windrowing citrus fruit that has previously been shaken from trees planted in rows.

In order to rake the area between trees on the tree row centerline and yet provide a single non-wavy window, a slide rake is disposed forwardly of and overlaps a main rake. The main rake does not reciprocate, therefore assuring a straight windrow. The slide rake, however, is reciprocated into and out of the tree row centerline in response to a control mechanism or slide rake actuator of the present invention when such mechanism moves into and out of contact with an abutment such as a tree trunk in the tree row centerline. The control mechanism operates when the vehicle is moving either forwardly or rearwardly.

It is therefore an object of the present invention to provide a control mechanism operable in response to movement relative to an abutment in a forward, a rear and an inclined direction to actuate a switch.

BRIEF DESCRIPTION OF THE DRAWINGS

FIG. 1 is a perspective of the windrowing machine with which the slide rake actuating or control mechanism of the present invention is associated, the windrowing machine being shown in an operative windrowing position.

FIG. 2 is a perspective of the windrowing machine with the rakes at a transport position.

FIG. 3 is a diagrammatic plan of the apparatus in operative position but with the slide rake in its retracted position.

FIG. 4 is a perspective of the slide rake actuator.

FIG. 5 is an operational view illustrating the slide rake actuator in a neutral position.

FIG. 6 is a view similar to FIG. 5 but showing the actuator being engaged when moving in the forward direction.

FIG. 7 is a view similar to FIG. 5 but showing the actuator being contacted when moving in a rearward direction.

FIG. 8 is a view similar to FIG. 5 but showing the actuator being contacted when the vehicle is moving in a direction angled relative to the normal direction of movement of the vehicle.

DESCRIPTION OF THE PREFERRED EMBODIMENT

The windrowing machine 15 (FIGS. 1, 2 and 3), with which the slide rake actuating or control mechanism of the present invention is associated, is specifically designed to windrow citrus fruit F previously shaken upon the ground from rows of trees T having tanks T' planted along a row centerline C. The machine 15 is designed to rake the fruit from between the trees T along the tree row centerline as well as from the area under the half row being raked, and to deposit all of this raked fruit into a single non-wavy windrow W.

Although the windrowing machine 15 will be described in the specification as handling citrus fruit, it will be understood that the machine may also handle other types of articles such as deciduous fruit and nuts, and even non-agricultural articles.

In general, the windrowing machine 15 (FIGS. 1-4) comprises a three-wheeled vehicle 16 having a generally horizontal boom assembly 17 pivotally connected thereto and projecting outwardly from one side thereof. A main non-reciprocating rake 18 and a reciprocable slide rake 19 are partially supported by the boom assembly 17 and are maintained in operative raking position angled outwardly and forwardly relative to the longitudinal axis of the vehicle by a connector such as a chain 20. The length of the chain may be varied to adjust the angle of the rakes relative to the longitudinal axis of the vehicle 16 so that a portion of the slide rake 19 will normally extend beyond the centerline of the tree row being raked when the vehicle is being driven midway between two tree rows. The control mechanism of the present invention, herein termed a slide rake actuating mechanism 21, is carried by the slide rake 19 and causes the slide rake to reciprocate out of the tree row centerline when the activator contacts an abutment such as a tree trunk T', and thereafter return to its extended position when past the obstruction. When being moved from grove to grove, for example, the rakes may be locked in a transport position with their longitudinal axes lying in a vertical plane parallel to the longitudinal axis of the vehicle 16.

A feature of the invention is the provision of the control mechanism or slide rake actuating mechanism 21 (FIGS. 4-8) which will operate to retract the slide rake 19 upon contact with an abutment such as a tree trunk T' when moving in a plurality of different directions indicated by the arrows A and B. The slide rake actuating mechanism 21 is mounted on a slide rake support tube 82 and is provided for actuating a switching mechanism in the form of a four-way hydraulic valve 200. The hydraulic valve 200 is connected to a slide rake cylinder 88 and a hydraulic pump 34 (FIG. 3) by conventional conduits (not completely shown). The valve 200 includes a spring loaded core and valve stem 202 which when moved to its left directs fluid into the cylinder 88 causing the cylinder to move the slide rake and slide rake supporting tube 82 along a bar 80 to its extended position. When the valve stem 202 is released and moved to its right rake retracting position (FIGS. 4-8), the valve causes the cylinder 88 to move the slide rake to its retracted position.

The slide rake actuating or control mechanism 21 includes an arm 204 pivoted at 206 to the tube 82 and normally urged against an abutment 208 by a spring 210. The spring 210 is connected between the free end of the arm 204 and an ear 212 rigid with the tube 82 to normally maintain the arm 204 spaced from and extending perpendicular to the valve stem 202 as illustrated in FIGS. 5 and 6. A valve actuating lever 214 is pivoted to the free end of the arm at 216 and has an elongated abutment sensing arm 218 with a curved outer end 220 rigidly secured thereto. A spring 222 is connected between the free end of the lever 214 and the tube 82 for normally holding the lever 214 in a position parallel to and against the arm as indicated in FIG. 5.

When the vehicle is windrowing while moving in the direction of arrow A and when the abutment sensing arm 218 and a portion of the slide rake 19 are projecting beyond the centerline of the tree trunk T', the slide rake actuating mechanism is in its neutral position shown in FIG. 5. Continued movement of the vehicle in the direction of arrow A causes the sensing arm 218 to contact a tree trunk T' thereby moving the switch actuating lever 214 about pivot point 216 away from the valve stem 202 thereby causing the slide rake tube 82 and slide rake 19 to move in the direction of arrow B to its retracted position as shown in FIG. 3 and 6. If it becomes necessary to reverse the direction of movement of the vehicle as indicated by arrow A in FIG. 7, then both the arm 204 and the lever 214 pivot as a unit about axis 206 to shift the valve 202 and retract the slide rake as indicated by the arrow B in FIG. 7. Similarly, if the vehicle is moved at an angle as indicated by the arrow A in FIG. 8, the arm pivots about pivot point 206 and the lever 214 pivots about pivot point 216 thereby again shifting the valve 202 causing the slide rake to retract as indicated by arrow B.

From the foregoing description it is apparent that the slide rake actuating or control mechanism of the present invention will actuate a switch to cause the slide rake of a windrowing machine to retract away from an abutment when the sensing arm of the actuating mechanism contacts the abutment in response to the harvester moving either forwardly, rearwardly, or at an angle relative to the centerline of the tree row being windrowed. Upon moving the sensing arm away from the obstruction, the actuating mechanism is effective to return the slide rake to its extended position.

Although the best mode contemplated for carrying out the present invention has been herein shown and described, it will be apparent that modification and variation may be made without departing from what is regarded to be the subject matter of the invention.

What I claim is:

1. An abutment responsive control mechanism for actuating a switch means having a switching element movable between an extended and a retracted position comprising: support means connected to and supporting said switch means and movable in at least two directions relative to the abutment, a lever supporting arm movably mounted on said support means, a switch actuating lever movably mounted on said support means, an abutment contacting element rigid with said switch actuating lever and disposed in position to engage the abutment upon relative movement of the abutment and said support means, resilient means connected to said switch actuating lever for normally holding said lever supporting arm and said switch actuating lever in retracted position with the switch actuating lever bearing against and moving said switch element to its retracted position, contact of said abutment contacting element with the abutment when said abutment and abutment contacting element are relatively moving in one direction causing said switch actuating lever to move relative to said lever supporting arm and away from said switch means allowing the switching element to move toward its extended position, and relative movement between the abutment and said abutment contacting element in the opposite direction causing said switch actuating lever and said lever supporting arm to move away from said retracted position allowing the switch element to move to its extended position.

2. A control mechanism according to claim 1 wherein said switch actuating lever is pivotally mounted on said lever supporting arm.

3. A control mechanism according to claim 1 wherein said switch actuating lever is pivotally mounted on said lever supporting arm, and wherein said lever supporting arm is pivotally supported on said support means.

4. A control mechanism according to claim 3 wherein said resilient means is connected between said switch actuating lever and said support means, and additionally comprising a second resilient means connected between said lever supporting arm and said support means.

5. A control mechanism according to claim 3 wherein said switch means and switching element are a hydraulic valve body and a movable valve core in said body, respectively.

6. A control mechanism for actuating a switch means having a switching element movable between an extended and a retracted position in response to contacting an abutment comprising; support means connected to and supporting said switch means and movable in at least two directions relative to the abutment, a first lever pivotally connected to said support means about a first pivot axis, first resilient means normally urging said lever to one end of its pivotal movement, a second lever pivoted to said first lever about a second pivot axis and adapted to contact said first lever when at one end of its pivotal movement, said second lever contacting and moving the switching element into one of its operative positions when both levers are pivoted to said limits of pivotal movement, resilient means normally urging said second lever to said one limit of its pivotal movement, and an abutment sensing arm rigid with said second lever, wherein contact of said sensing arm with the abutment when the relative movement is in one direction causes pivotal movement of said first and second levers about said first axis to move said second lever away from said switch element, and wherein contact of said sensing arm with the abutment when the relative movement is in the opposite direction causes pivotal movement of said second lever away from said switch element about said second axis.

* * * * *